DATA PROCESSING FOR EDGE CODED CARDS

Filed Aug. 13, 1959 4 Sheets-Sheet 1

INVENTORS
MANFRED R. KUEHNLE
AARON L. KELLER
BY Joseph Weingarten
ATTORNEY

DATA PROCESSING FOR EDGE CODED CARDS

INVENTORS
MANFRED R. KUEHNLE
AARON L. KELLER
BY Joseph Weingarten
ATTORNEY

DATA PROCESSING FOR EDGE CODED CARDS

INVENTORS
MANFRED R. KUEHNLE
AARON L. KELLER
BY Joseph Weingarten
ATTORNEY

DATA PROCESSING FOR EDGE CODED CARDS

Filed Aug. 13, 1959 4 Sheets-Sheet 4

INVENTORS
MANFRED R. KUEHNLE
AARON L. KELLER
BY Joseph Weingarten
ATTORNEY

United States Patent Office 3,034,643

Patented May 15, 1962

3,034,643

DATA PROCESSING FOR EDGE CODED CARDS

Aaron L. Keller, Canton, and Manfred R. Kuehnle, Lexington, Mass., assignors, by mesne assignments, to Itek Corporation, a corporation of Delaware Filed Aug. 13, 1959, Ser. No. 833,606
19 Claims. (Cl. 209—74)

This invention relates in general to data handling systems and more particularly concerns a system in which information is recorded on a large number of cards, each card having a code indicative of the information recorded thereon arranged upon an edge surface. Apparatus is provided for retrieving any desired card from a store containing a large number of coded cards even though such cards have been randomly filed without regard to any preconceived plan.

Data storage and information retrieval systems employing cards coded in various fashions are well known and, indeed, are widely used. The cards used in such systems are coded in several different ways among which are: (1) an arrangement of holes punched into the face of the card, (2) notches cut into the edge of the card, and (3) magnetic tracks secured to the face of the card. Several of the other known systems employ cards made from photographic film and code those cards either by a pattern of opaque and transparent dots arranged on the face of a card or by means of a variable density track arranged along the side of the card in much the same manner that a sound track is arranged along the side of a motion picture film.

The common feature of these coded cards, with the exception of the edge notched cards, is the utilization of the face area of the card for coding, requiring the retrieval apparatus to scan or sense part or all of the face area when it is desired to retrieve a specific card from a store of similar cards. But in order to conserve storage space, cards are customarily stacked face to face so that during the retrieval operation the cards must be separated to provide access to the coded face area. The necessity for separating a large number of cards has several undesirable aspects, among which are the wearing away of the cards due to their sliding over one another during the separation process; relatively slow access speed as each card must be individually extracted from a stack and then scanned; and the large mechanical effort expended in selecting the desired card from a large stack because all the cards ahead of the wanted card must be removed or affected during the search operation.

These disadvantages are avoided by the present invention which basically comprises a plurality of edge-coded cards, means for scanning the coded edges without moving or touching the cards until the desired card is found, and mechanism for yielding up the card or the data contained on the card.

The cards of this invention are stacked horizontally in a frame or magazine; a side edge of each card displays a pattern of coded markings consisting of light and dark dots. These dots are either reflective or non-reflective. A scanner carriage mounted on the card frame surrounds the stack at its cross-section and can travel along the stack frame at a high speed. This carriage incorporates a light source, an array of light sensitive elements and an ejector or retrieval mechanism.

When a particular card is desired, its coded designation is set up as an input signal in appropriate electronic circuitry such as a comparator and the scanner carriage is coursed at high velocity along the stack of cards. Radiant energy from the light source in the carriage is reflected or absorbed by the code markings on the edges and the reflected light is received by the light sensitive elements and transmitted to the comparator circuit as a code signal. When this coded output signal corresponds with the searched code input signal, the carriage will stop at the location of the card and will push the card out to the top of the carriage where a card receiving station is provided. After the card is retrieved, the carriage continues to travel to the end of the card stack where projection or duplication of the card can be accomplished. After use the card is refiled at the front end of the stack by a refiling mechanism.

In the more detailed description following the invention is illustrated by thirteen figures in which.

THE SYSTEM GENERALLY

Figure 1:
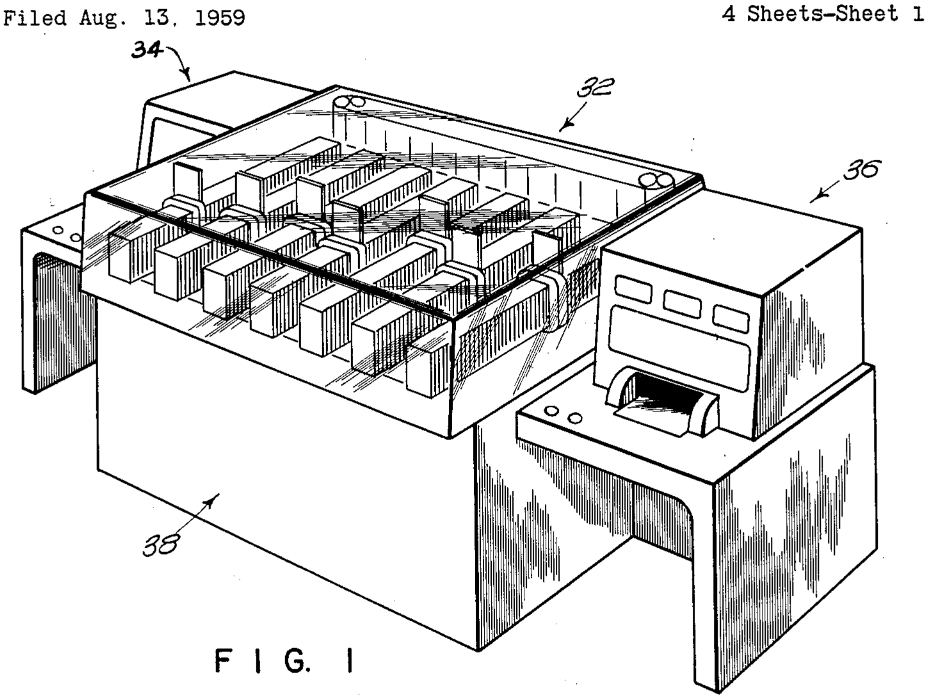
FIG. 1 is a cutaway perspective view of a console showing a plurality of cards arranged in separate magazines, with a viewing screen at one side and a duplicator at the other side.
Figure 2:
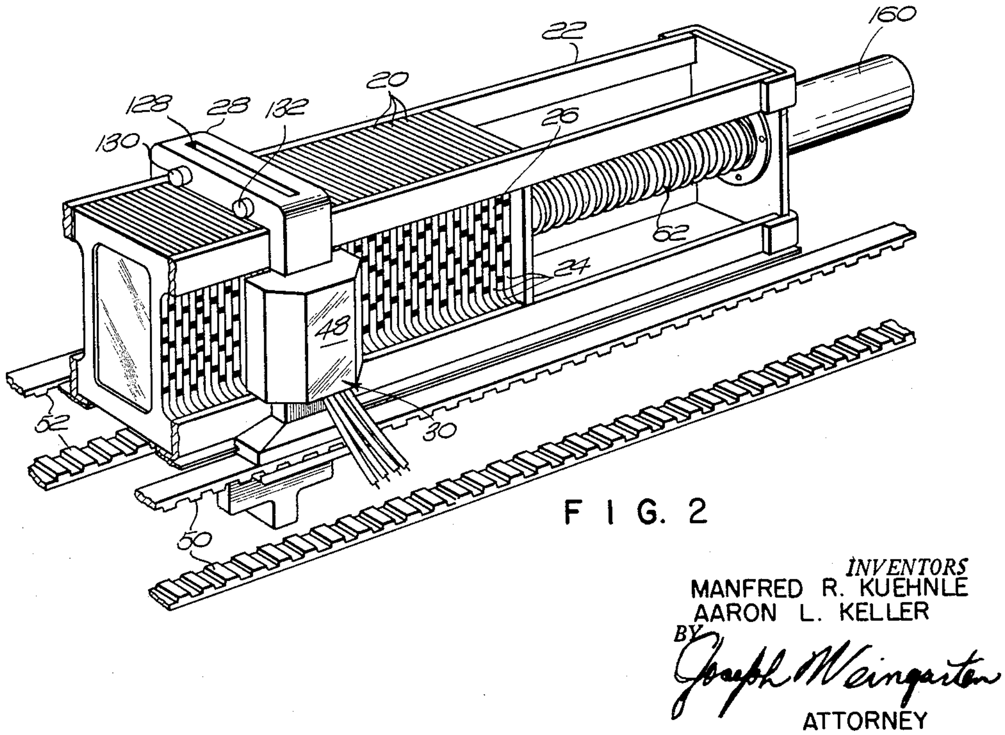
FIG. 2 is a perspective view of the scanner carriage in position on a card magazine.
Figure 3:
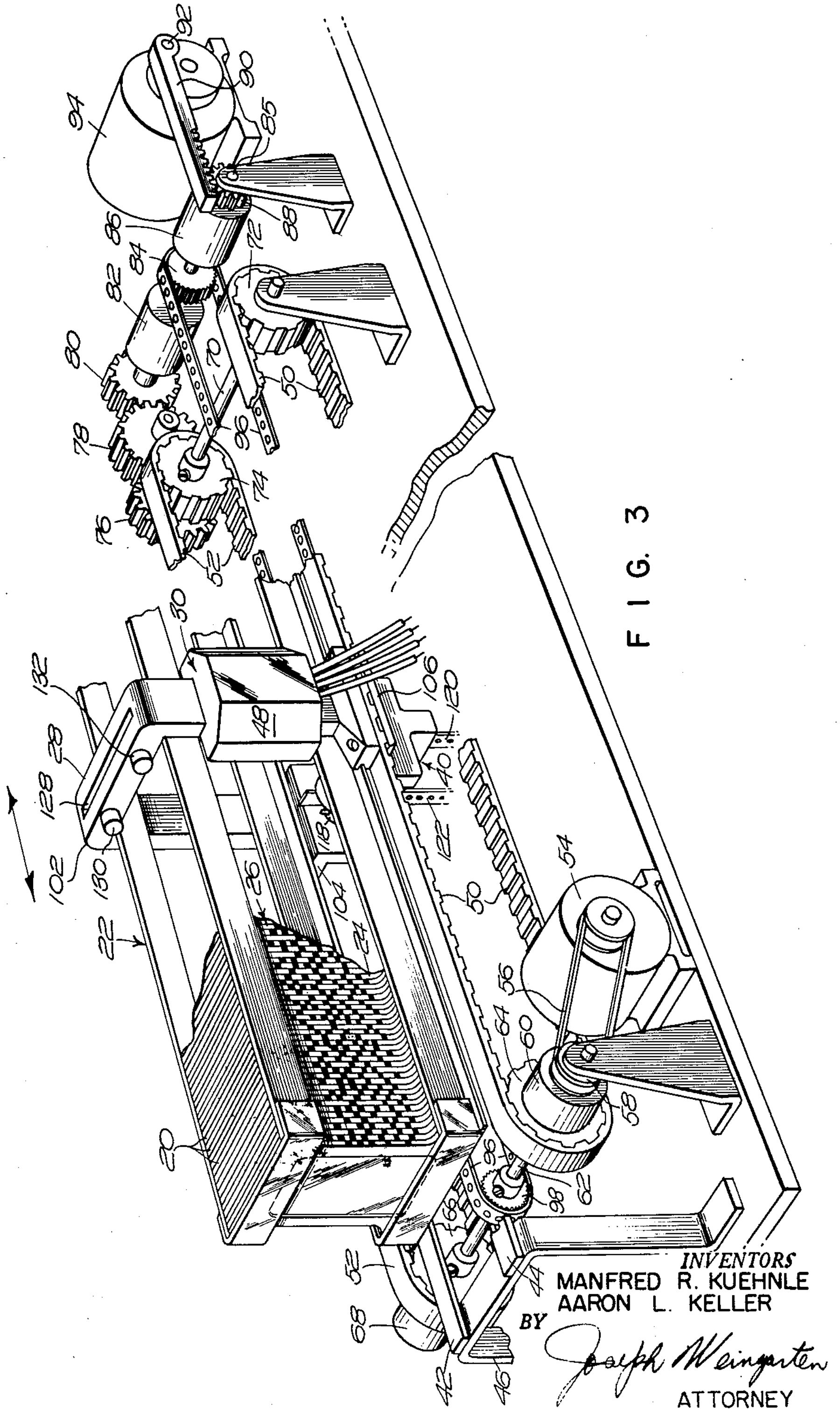
FIG. 3 is a perspective view of the cards in a magazine which is cutaway to show details of the traversing system for the scanner carriage.

The general organization of the invention is illustrated in FIGS. 1–3. As will be seen in FIG. 2, a store of cards 20 is arranged in a face to face stack in a magazine 22. One edge 24 of each of the cards 20 has a code generally designated 26, all the coded edges 24 being adjacent when in the magazine 22. A carriage 28 is disposed about the magazine 22 so as to be movable along its entire length. Mounted on the carriage 28 is a sensing device 30 which senses the various coded end edges 24 and produces an electrical output signal corresponding to each coded edge.

Although it forms no part of this invention, a number of magazines 22 may be collected in a console 32 as indicated in FIG. 1. The embodiment illustrated includes a viewing station 34 and a reproduction station 36 and the necessary electronic equipment as indicated at 38. In this application the operator has available a panel of alpha-numerical buttons (not shown) with which he may designate the unique code of any particular card 20. Actuating the buttons causes a pattern of electrical signals equivalent to the desired card code to be transmitted to coincidence circuitry, a part of the electronic sections 38 of the system; simultaneously the carriage 28 is started in its course along the magazine 22.

When the sensing device 30 on the carriage 28 reaches the card desired, the coincidence circuit receives a pattern of signals identical to that stored, causing the carriage to stop. An ejection mechanism 40 makes the selected card available for direct viewing at station 34 or for reproduction at station 36.

*Mechanical Apparatus*

FIG. 3 illustrates certain mechanical components of the invention with portions broken away to show the mechanical interrelationship of various parts of the apparatus. The magazine 22 containing a stack of edge coded cards 20 is positioned upon a pair of elevated rails 44 and 44; the rails are supported at their ends upon platforms formed, for example, by a bracket 46. The carriage 28 has a lateral housing 48 in which is disposed the code sensing device 30, the carriage being secured to a pair of movable tooth belts 50 and 52 so that it may be rapidly transported along the length of the magazine permitting the sensing means to scan the code 26 on each card 20. The two belts 50 and 52 are driven by a motor 54 having a conventional drive belt 56 which transmits rotary motion to a pulley 58. An electrically controlled clutch 60 is employed to couple the pulley 58 to shaft 62, the shaft having secured thereto a pair of gears 64 and 66 which are in engagement with the belts 50 and 52. A brake 68, controlled by means of electrical signals, is connected to one end of the shaft 62, that brake being effective to quickly stop the rotary motion of the shaft 62.

Spaced from the shaft 62 and suitably supported for rotation is a second shaft 70 to which is secured a pair of gears 72 and 74 driven by the motor 54 through the clutch 60 and the belts 50 and 52. A third gear 76, which alternatively may be simply an extension of the gear 74, is secured to and rotates with the shaft 70. An idler gear 78 is driven by the gear 76 and in turn drives a gear 80, the latter gear being coupled through an electrically actuatable clutch 82 to a sprocket 84 mounted on a shaft 85. Another electrically controlled clutch 86 provides a detachable coupling between the sprocket 84 and a pinion 88, the pinion being meshed with a rack 90 driven through an eccentric connection 92 by a motor 94. A perforated endless belt 96 is supported between the sprocket 84 and a second sprocket 98 mounted on shaft 62 in a manner permitting the sprocket 98 to rotate freely relative to the shaft. In order to prevent the sprocket 98 from sliding longitudinally along the shaft 62, any suitable means, such as a pair of collars disposed on either side of the sprocket and connected to the shaft 62, may be employed.

Figures 4, 5, 6, 7, 8:
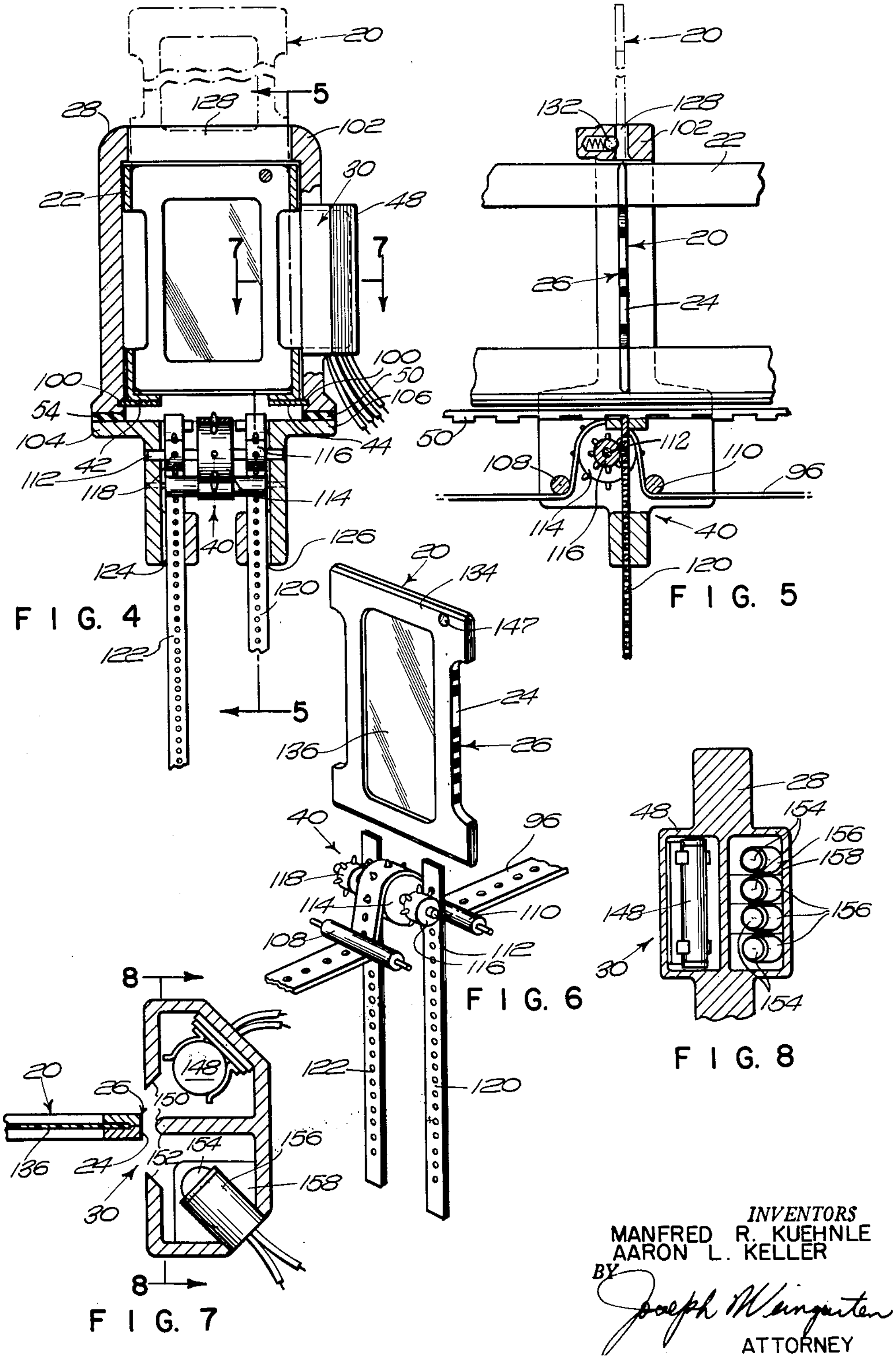
FIG. 4 is an end view of the scanner carriage and its ejection mechanism surrounding a card stack showing in phantom, a card partially ejected therefrom.
FIG. 5 is a side view taken on the line 5—5 of FIG. 4 of the scanner carriage and ejection mechanism.
FIG. 6 is a perspective cutaway view of a detail of the ejection mechanism in operative relationship with a desired card.
FIG. 7 is a top view taken on the line 7—7 of FIG. 4 of the scanning device in operative relation to an edge coded card.
FIG. 8 is a front view taken on the line 8—8 of FIG. 7 of the scanning device.

Referring now to FIG. 4 which shows a vertical section through the carriage 28, the magazine 22 is shown resting upon the rails 42 and 44 and the rails are seen to extend into slots 100 in the legs of the carriage so that when the carriage moves it is guided by and slides upon the rails. To insure that the carriage 28 moves freely upon the rails, it may be provided with ball or roller bearings to reduce friction. Basically, the carriage 28 consists of an inverted U-shaped yoke 102 to which is secured a pair of brackets 104 and 106 whereby the belts 50 and 52 are clamped between the lower ends of the yoke and the brackets.

Journaled in the brackets 104 and 106 are a pair of rollers 108 and 110 and a shaft 112, the shaft having secured to it a drive sprocket 114 and a pair of ejection sprockets 116 and 118. Perforated belt 96 engages the teeth of sprocket 114 and is looped under rollers 108 and 110 in the manner illustrated in FIGS. 5 and 6. Ejector elements 120 and 122 are flat metallic perforated strips, the perforations being engaged by the toothed ejector sprockets 116 and 118 secured to the shaft 112. The ejector strips 120 and 122 are guided in their vertical movement by sleeves 124 and 126 at the lower portion of the brackets 104 and 106. When sprocket 114 is rotated, the ejectors 120 and 122 are caused to move vertically upwardly or downwardly in accordance with the direction of rotation of the sprocket.

As shown in FIGS. 2 and 3, the carriage 28 surrounds the magazine 22 containing the stack of cards 20. Since the carriage is movable along rails 42 and 44 the ejectors 120 and 122 may be positioned under any selected card in the stack as is best seen in FIGS. 5 and 6. A slot 128 is provided in the upper yoke portion of carriage 28 so that when the ejectors 120 and 122 are moved upwardly they push the superjacent card 20 upwardly through the slot in the carriage. A pair of spring bias balls 130 and 132 in the slot 128 are positioned to bear only upon the frame of the card 20 and not upon the film as the card is moved upwardly. The card is pushed by the ejectors 120 and 122 until it is in the position illustrated in phantom in FIGURE 5 where the card is held in the slot 128 by the pressure of the balls 130 and 132 bearing against the bottom of the card.

*The Cards*

Figures 9, 10, 11, 12, 13:
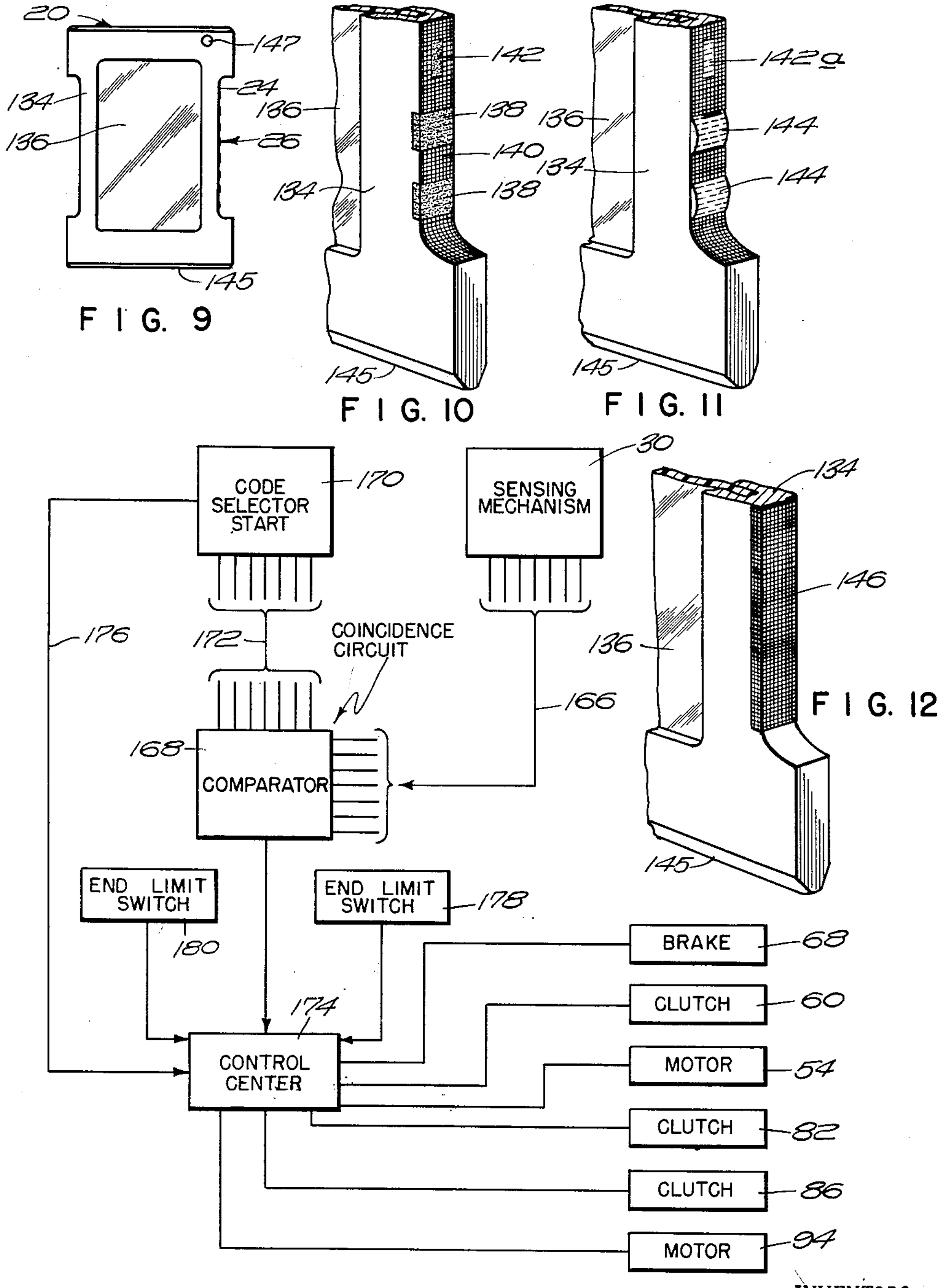
FIG. 9 is a face view in half scale of an edge coded card for 70 mm. film.
FIG. 10 is an enlarged detail of FIG. 9 showing coding by use of reflective bits affixed to a card edge.
FIG. 11 is an enlarged detail of FIG. 9 showing coding by use of imbedded magnetic particles.
FIG. 12 is an enlarged detail of FIG. 9 showing coding by use of magnetic tape affixed to a card edge.
FIG. 13 is a basic block diagram of the electrical system and connections of the invention.

The preferred physical appearance of a card 20 is shown in FIG. 9. The card consists of a frame 134 having a film insert 136. The information, which may be pages of a book or the records of the business transactions of a particular customer, for example, is recorded on the film 136 by any suitable photographic process. After the film is processed to fix the photographic image, it is mounted in the frame 134.

This frame 134 is essentially a rectangular member which can be made of cardboard or plastic having indentations on opposite sides with a central aperture in which the film insert 136 is located. The indented edge surface of one side 24 is coded in a manner compatible with the type of sensing mechanism 30 employed. Where the sensing of the code is to be performed by photoelectric apparatus, the edge 24 of frame 134 may be coded with a light reflecting material. This could be aluminum paint or an attached strip of aluminum foil; portions of the light reflecting surface may be removed or covered with a non-reflecting material, the juxtaposition of the reflecting and non-reflecting areas constituting a code. The magnified card detail of FIG. 10 illustrates two reflecting bits 138 with a non-reflecting bit 140 between. The smaller central code bit 142 does not extend fully across the edge 24 whereas all the other code bits completely traverse the width of the edge surface. The purpose of code bit 142 is to provide a triggering signal to the sensing mechanism which causes that mechanism to simultaneously read all the code bits on the edge of any one frame. In other words, the bit 142 assures that the sensing device 30 is fully aligned at the vertical center of edge 24 before read-out occurs.

In those cases where sensing of the code 26 is to be performed by a magnetic means, the indented edge surface 24 of the frame 134 may be coded by attaching ferro-magnetic particles 144 to the edge surface as shown in FIG. 11 or by adhering a strip of magnetic tape 146 to the edge surface as depicted in FIG. 12. The trigger bit 142*a* of FIG. 11 is also made of a ferro-magnetic substance. Any ferro-magnetic material substitute having two stable states of magnetization may be employed.

Further refinements in the cards are possible for use in particular applications. Clearly, both side edges of any card 20 could be coded; and, in addition, the top and bottom edges can be utilized for coding purposes.

The bottom 145 of the card frame 134 may be chamfered or beveled to make reinsertion easier. To assist in verifying proper card alignment, the cards might be provided with a visible dot 147 as shown in FIG. 9.

In certain applications it may be advantageous to employ black plastic for the frame 134 which is aluminized thereby permitting the code for any card to be made by merely scratching off bits of the reflective aluminum surface exposing the non-reflective black plastic.

But the system is not limited to the use of a photographic insert in a stiff frame. A "card" could be made completely of glass with coding on an edge thereof as already described. The information on the glass surface would be digital to be read by photoelectric means. The basic features of this invention, rapid and random access, would make this type of data storage highly advantageous in many applications.

*Sensing Mechanism*

Within the lateral housing 48 of the carriage 28 is disposed the code sensing mechanism 30. Assuming that the cards 20 are coded by an arrangement of light reflecting and non-reflecting materials, the code 26 is sensed by the mechanism illustrated in FIGS. 7 and 8. The light from a lamp 148 is permitted to radiate through an aperture 150 in the housing 48. Where the light impinges upon a light reflecting surface, the light is reflected through a second aperture 152 of the housing to a lens 154 which converges the light rays upon a photo cell 156, whereupon the photo cell responds to the presence of the reflected light in a manner giving rise to the generation of an electrical signal. A separate photo cell 156 is required for each code bit so that the housing contains a plurality of photo cells arranged one above another with opaque partitions 158 separating adjacent photo cells to cut off reflections from above and below the code bit being "viewed" by the particular photo cell. The electrical signals from the sensing mechanism are utilized to identify a selected card in a manner presently to be described.

In order for the scanning mechanism 30 to sense the entire code 26 on the edge surface 24 of the card 20 at the same instant, the edge of the card must be aligned with the aperture of the housing 48 and hence the card must be maintained in an erect position. A certain maximum skewness is permissible because the trigger bit 142 requires the sensing device to be "dead" on before reading occurs.

Since the number of cards 20 contained in any magazine 22 will vary as some cards are withdrawn and others are added to the stack at various times, the magazine is provided with a device which maintains the cards densely packed. The device may be any suitable mechanism which compresses the cards into a dense stack, such as a piston 160 forced against one end of the stack by a spring 162 shown in FIG. 2.

*Electrical Arrangement*

The electrical arrangement of the invention is illustrated in block diagrammatic form in FIG. 13. The sensing mechanism block 30 represents the plurality of photo cells 156 within the housing 48 of the carriage 28, the output signals of those photo cells being transmitted over a cable 166 to a comparator 168. A code selector 170 connected to the selection panel is provided having a plurality of output lines which are connected by cable 172 to the input of comparator 168. Preferably, code selector 170 is an electronic device having a keyboard and housing a plurality of bistable circuits, each of the circuits being adapted to be placed in one of its two stable states by means of a key on the switchboard. The code selector 170 also includes a Start switch which is electrically connected to a control center 174 by a conductor 176.

Comparator 168 is a device which compares the output signals from code selector 170 with the output signals from sensing mechanism 30 and generates an output signal when the pattern of signals from the sensing mechanism coincides with the pattern of signals from code selector 170. Comparator 168, by way of example, may include a number of coincidence circuits equal to the number of bits in the code 26 employed on the edge surface 24 of the card, each of those coincidence circuits being arranged to provide an output signal only when the input signal from the code selector 170 corresponds to the input signal from the sensing mechanism 30. The outputs of the coincidence circuits may be tied to a logical and circuit, the latter providing an output in response to simultaneous input signals from all the coincidence circuits. Other types of comparators are suitable for use in this invention and it is to be understood that the specific internal construction is immaterial to the invention so long as the system as a whole functions in the manner previously described.

Output signals from the comparator 168 are transmitted to the control center 174, which governs the operation of brake 68, clutch 60, motor 54, clutch 82, clutch 86, and motor 94 by means of control signals transmitted over lines connected to each of those elements. A pair of limit switches, represented by the blocks 176 and 178, are electrically connected to the control center 174. These switches determine the extent of travel of the carriage 28.

*Operation*

Any desired card in magazine 20 may be located by setting into the code selector 170 the appropriate code for that card and actuating the Start switch. At the initiation of any cycle of operation, the carriage 28 is always at one limit of its travel, assumed, for purposes of exposition, to be a position adjacent the left end of the rails 42 and 44. It will also be assumed that clutches 60 and 82 and brake 68 are normally engaged in the absence of any signal from the control center, and that clutch 86 is normally disengaged in the absence of any control center signal.

Actuation of the Start switch completes a circuit in control center 174 and that center causes brake 68 to be released and motor 54 to be energized at a high speed. Because clutch 60 is engaged, the gears 64 and 66 drive the belts 50 and 52 causing the carriage 28 to be swiftly moved toward the right so that the sensing mechanism 30 on the carriage scans the code 26 of each card 20 in turn, the sensing mechanism reading the code of each card when it is triggered by the triggering bit 142 contained in the code. Thus the code 26 on the edge surface 24 of each card 20 is translated by the sensing mechanism into a pattern of simultaneous electrical signals corresponding to the light reflecting and non-reflecting bits 138 and 140 in the code.

The motion of belts 50 and 52 causes gears 64 and 66 to rotate, driving the gear train 76, 78 and 80, the latter gear of the train being coupled by clutch 82 to sprocket 84. Rotation of sprocket 84 causes the perforated belt 96 to move in the same direction and at the same speed as the carriage 28, and because there is no relative motion between the belt and the carriage the sprocket 114 supported underneath the carriage does not rotate. At this time clutch 86 is disengaged so that motor 94 is not affected by rotation of the shaft 85 to which sprocket 84 is secured.

As the sensing mechanism 30 reaches each coded card 20, it is triggered and provides signals to comparator 168 which are compared with the input from code selector 170. When the desired card is scanned by the sensing mechanism 30, the pattern of signals from it will correspond to the pattern of signals from code selector 170. Thereupon the comparator 168 provides a signal to the control center 174 causing the center to de-energize motor 54 and engage brake 68 which quickly brings carriage 28 to a halt. This completes the first run, or detection run, of the operation.

However, due to the mass and velocity of the moving parts, the carriage 28 cannot be stopped instantaneously and it overshoots the desired card. The control center 174 then automatically causes brake 68 to be released and energizes motor 54 in the reverse direction at a slow speed causing the carriage 28 to move slowly in the reverse direction, this being the selection run. When the carriage again reaches the desired card, the signals from the sensing mechanism 30 cause the comparator 168 to provide a second signal to the control center 174 which in turn immediately causes brake 68 to engage and hold the carriage immovable while concurrently disengaging clutch 60 and deenergizing motor 54. The control center 174 then disengages clutch 82, engages clutch 86 and energizes motor 94.

Upon energization of motor 94, the rack 90 drives pinion 88, causing sprocket 84 to rotate which in turn drives perforated belt 96. Movement of belt 96 causes sprocket 114 beneath the carriage 30 to rotate so that the ejectors 120 and 122 are moved upwardly by the rotation of sprockets 116 and 118 to push the desired card upwardly through slot 128 in carriage 28. Because rack 90 is driven by motor 94, and the drive shaft of the motor makes one complete revolution each time that it is energized by the control center 174, the rack reciprocates to and fro over one cycle, rotating the pinion 88 in one direction for a half cycle of motor shaft revolution and rotating the pinion in the opposite direction during the second half cycle. Since pinion 88 is coupled by clutch 86 to sprocket 84, the sprocket causes perforated belt 96 to move in one direction to raise the ejector strips 120 and 122 and then causes the belt to move in the opposite direction to lower the ejectors. As a consequence of one cycle of operation of motor 94, the selected card is pushed upwardly into the slot 128 in carriage 28 where its lower portion is gripped by the spring pressed balls 130 and 132 and is maintained in that position.

Upon the conclusion of one cycle of operation of motor 94, the control center 174 causes brake 68 to be released, causes clutches 60 and 82 to engage and clutch 86 to disengage, and energizes motor 54 at a high speed in a direction to move the carriage 28 back to its initial position. As the carriage 28 approaches its initial position, the limit switch 178 is actuated causing brake 86 to be applied concurrently deenergizing motor 54. Associated apparatus, not illustrated and not forming part of this invention, removes the selected card from the carriage 28 and carries it to a station for further processing. In the event that a desired card is not present in the magazine, the carriage will travel to the opposite end of the magazine 22 and actuate limit switch 180 which causes the control center 174 to bring the carriage to a stop and reverse the direction of rotation of motor 54 to bring the carriage back to its initial position.

The magazine 22 can be exchanged with other similar magazines so that the device shown in FIG. 3 may be used to search a large number of stacks, or alternatively, as shown in FIG. 1, a number of magazines may be operated at a console to increase the card store capacity for any given application.

It is evident that numerous modifications of and departures from the specific system described herein may be practiced by those skilled in the art without departing from the inventive concepts. Consequently, the invention is to be construed as limited only by the spirit and scope of the appended claims.

What is claimed is:

1. A data handling system comprising, a plurality of data cards each having a coded edge, a movable carriage, means for propelling said carriage along a predetermined path, said cards being arranged with their coded edges adjacent said predetermined path, code sensing means carried by said carriage, said code sensing means being arranged to scan in sequence said coded edges of said cards and to provide electrical code signals representative of said cards, and card selection means to locate a selected card for retrieval of the data therefrom in response to a predetermined code signal.

2. A device for locating one information carrying card among a plurality of such cards stacked in a magazine, each of said cards having a unique code on an edge thereof, the coded edges of said cards being adjacent in said magazine, card selection means providing an electrical signal output identifying the edge code of a desired card, a sensing device having an electrical output means for sequentially reading said coded edges, means for traversing said sensing device in operative relationship to said adjacently arranged coded edges along the length of said magazine, and means for indicating when said sensing device has an output signal comparable to the signal from said selection means.

3. A device for locating one information carrying card among a plurality of such cards stacked in a magazine, each of said cards having a unique code on an edge thereof, the coded edges of said cards being adjacent in said magazine, card selection means providing an electrical signal output identifying the edge code of a desired card, a sensing device having an electrical output means for sequentially reading said coded edges of individual cards, means for traversing said sensing device in operative relationship to said adjacently arranged coded edges along the length of said magazine, and means for indicating when said sensing device has an output signal from an individual card comparable to the signal from said selection means.

4. Data handling apparatus comprising, a plurality of data cards each having a coded edge, a movable carriage, means for guiding said carriage along a predetermined path adjacent said coded edges of said data cards, a motive power source for causing said carriage to move along said path, scanning apparatus carried by said carriage for sequentially sensing said coded edges of said data cards, an ejector mechanism secured to said carriage, and means for actuating said ejector mechanism for selection of a data card bearing a predetermined edge code.

5. In a data handling system, the improvement comprising: a plurality of flat frames having data recorded on the faces thereof, a unique identifying code arranged along the edge of each of said frames, a magazine for holding said plurality of frames, said magazine having an aperture providing access to the coded edges of said frames, compacting means in said magazine for causing said frames to have their adjacent flat surfaces in confronting relation, a code sensing mechanism disposed adjacent said aperture in said magazine, and means for causing said code sensing mechanism rapidly to scan the code of each frame in said stack and to provide electrical code signals representative of said cards, and card selection means to locate a selected card for retrieval of the data therefrom in response to a predetermined code signal.

6. A system for automatically selecting one of a plurality of edge coded cards of like configuration arranged in a magazine with coded edges in alignment, each of said edge codes being unique and formed of an arrangement of reflective and non-reflective areas, an electro-optical scanning device and sensing mechanism disposed in operative relation with said reflective coded edges, means for traversing said scanning device along said card magazine whereby each of said reflective coded edges is selectively scanned by said sensing mechanism and means responsive to the output of said electro-optical scanning and sensing mechanism for ejecting a card having a particular code from said magazine.

7. In a data handling system the combination of a track, a carriage arranged to move along said track, card ejector means on said carriage, said ejector means including an actuator, an endless belt paralleling said track and engaging said actuator, belt support means permitting said belt to run freely so that said moving carriage and said belt have no relative motion therebetween, a motor for driving said belt, a clutch normally uncoupling said motor from said belt, and means for causing said clutch to couple said motor to said belt when said carriage is stopped whereby said belt drives said actuator.

8. A data handling system of the type for retrieving coded cards comprising: a movable carriage, sensing means carried by said carriage for sequentially detecting the code on each of said cards and providing a pattern of electrical signals corresponding to the detected code, a code selector for providing a pattern of electrical signals identifying the code of the card to be retrieved, a comparator for continuously comparing said patterns of electrical signals derived from said sensing means and said code selector, said comparator providing an output signal when for a predetermined card said compared patterns coincide, control means responsive to said output signal for governing the motion of said carriage whereby said carriage is stopped in a desired position relative to said predetermined card, and card ejector means carried by said carriage, said card ejector means being responsive to said output signal for causing said predetermined card to be ejected.

9. The system defined in claim 8, said carriage moving means being arranged to move said carriage rapidly in one direction when said carriage is detecting the code on each card, and to move said carriage slowly in a reverse direction after the carriage has passed said predetermined card.

10. A data handling system of the type for retrieving coded cards comprising: a movable carriage, means for moving said carriage, sensing means carried by said carriage for sequentially detecting the code on each of said cards and providing a pattern of electrical signals corresponding to the detected code, a code selector for providing a pattern of electrical signals identifying the code of the card to be retrieved, a comparator for continuously comparing said patterns of electrical signals derived from said sensing means and said code selector, said comparator providing an output signal when for a predetermined card said compared patterns coincide, control means responsive to said output signal for governing the motion of said carriage whereby said carriage is stopped after passing said predetermined card, further control means sequentially reversing the motion of said carriage whereby said carriage is stopped at said predetermined card, and card ejector means actuated upon termination of said reverse carriage motion for ejecting said predetermined card.

11. A data handling system of the type for retrieving coded cards comprising: a movable carriage, means for moving said carriage rapidly in one direction, slowly in a reverse direction, sensing means carried by said carriage for sequentially detecting the code on each of said cards and providing a pattern of electrical signals corresponding to the detected code, a code selector for providing a pattern of electrical signals identifying the code of the card to be retrieved, a comparator for continuously comparing said patterns of electrical signals derived from said sensing means and said code selector, said comparator providing an output signal when for a predetermined card said compared patterns coincide, first, second and third control means responsive to said output signal for governing the motion of said carriage whereby said carriage is stopped by said first control means on a first occasion after passing said predetermined card, said second control means sequentially reverses the motion of said carriage whereby said sensing means detects the code of each card it passed after said predetermined card, and said sensing means upon sensing said predetermined card on a second occasion said output signal causes said third control means to stop said carriage precisely at said predetermined card.

12. A data handling system of the type for retrieving coded cards comprising a plurality of edge coded cards, said cards being of like configuration and arranged densely stacked in closely adjacent relation in a magazine with coded edges in alignment, each of said edge codes being unique, a movable carriage, means for traversing said carriage rapidly along said magazine in one direction and slowly in a reverse direction, sensing means carried by said carriage comprising a photoelectric apparatus disposed in operative relation with said reflected coded edges to provide a pattern of electrical signals corresponding to the detected code, card ejection means on said carriage, a code selector for providing a pattern of electrical signals identifying the code of the card to be retrieved, a comparator for continuously comparing said patterns of electrical signals derived from said sensing means and said code selector, said comparator providing an output signal when for a predetermined card said compared patterns coincide, control means responsive to said output signal for governing the motion of said carriage whereby said carriage is stopped after passing said predetermined card, further control means sequentially reversing the motion of said carriage whereby said carriage is stopped at said predetermined card, said card ejector means actuated upon termination of said reverse carriage motion for ejecting said predetermined card, and compacting means for maintaining said cards in closely adjacent relation in said magazine after ejection of said predetermined card.

13. Apparatus for locating a desired card among a plurality of similar cards comprising in combination: a stack of edge coded cards arranged in a magazine, a scanning device having sensing means for reading said coded edges without touching said cards, means for traversing said scanning device at a relatively rapid rate along said magazine in one direction for a detection run, means for stopping said scanning device when said desired card is passed, means for traversing said scanning device in the opposite direction for a selection run at a rate relatively slow in comparison with said rate of said detection run, means for stopping said sensing scanner precisely at the desired card during said detection run, and ejection means on said scanning device causing the desired card to be removed from the remainder of said cards when the selection run is completed.

14. A card retrieval system of the type having a plurality of densely stacked cards contained in a magazine, each of the cards having a coded edge and the magazine being open to permit access to the coded edge, the improvement comprising; a movable carriage, means for propelling said carriage along a path adjacent to said magazine, code sensing means supported on said carriage, a sprocket wheel supported for rotation on said carriage, a perforated belt engaging said sprocket wheel, a motor, a clutch for coupling said motor to said belt to cause the perforated belt to be driven by said motor, means for supporting said perforated belt to permit unrestrained motion of said belt when said clutch uncouples said motor, a card ejector carried by said carriage, and means interconnecting said card ejector and said sprocket wheel whereby rotation of said sprocket wheel causes the extension and retraction of said ejector.

15. The improvement according to claim 14 and further comprising: a code selector mechanism for providing code signals identifying a selected card, a signal comparator connected to said selector mechanism and said sensing means, means responsive to said comparator for causing said carriage to align said card ejector with the selected card, and means for energizing said motor upon said alignment to cause said ejector to eject the selected card from the stock of cards in said magazine.

16. The improvement according to claim 15, in which said carriage is provided with an aperture for receiving the ejected card, and said carriage is provided with means for holding said card on said carriage.

17. In a data handling system the combination comprising a movable carriage arranged to traverse a predetermined track and stop at a desired point on said track, carriage moving means, an endless belt having one reach as long as said track and extending substanitally parallel thereto, means for moving said belt at a velocity equal to that of said carriage when said carriage moves, movable means carried by said carriage and operated by said endless belt when said carriage is stationary, and ejection means coupled to said movable means for retrieving data when said carriage is stationary and said movable means is operative.

18. In a data handling system of the type having a plurality of cards, each card being coded by a pattern of reflecting and non-reflecting bits arranged upon an edge, a code scanning apparatus comprising: a source of radiant energy, means for directing energy from said source at a coded edge of a card, a plurality of photosensitive devices, each of said devices being disposed to receive radiant energy reflected from a different bit of the code pattern, a carriage on which said photosensitive devices are mounted, means for rapidly propelling said carriage to cause scanning apparatus to rapidly scan a stack of said edge coded cards, a code selector mechanism for selecting a desired card, a comparator coupled to said code scanning apparatus and said selector mechanism, and means controlled by said comparator for causing said carriage to stop at the position of said desired card.

19. A data handling system comprising a plurality of data cards each having a coded edge, code sensing means, a carrier relatively movable along a predetermined path with respect to said cards, said cards being arranged with their coded edges adjacent said predetermined path, code sensing means carried by said carrier, said code sensing means being arranged to scan in sequence said coded edges of said cards and to provide electrical code signals representative of said cards, and card selection means to locate a selected card for retrieval of the data therefrom in response to a predetermined code signal.

References Cited in the file of this patent

UNITED STATES PATENTS

| | | |
|---|---|---|
| 2,131,503 | Elliott | Sept. 27, 1938 |
| 2,195,845 | Wilson | April 2, 1940 |
| 2,213,184 | Andrews | Sept. 3, 1940 |
| 2,251,828 | Hammond | Aug. 5, 1941 |
| 2,357,455 | Bryce | Sept. 5, 1944 |
| 2,511,859 | Langan | June 20, 1950 |
| 2,640,647 | Rand | June 2, 1953 |
| 2,902,329 | Brink et al. | Sept. 1, 1959 |
| 2,904,174 | Emerson | Sept. 15, 1959 |
| 2,918,656 | Nolde et al. | Dec. 22, 1959 |